United States Patent [19]
Spath

[11] Patent Number: 5,846,043
[45] Date of Patent: Dec. 8, 1998

[54] CART AND CADDIE SYSTEM FOR STORING AND DELIVERING WATER BOTTLES

[76] Inventor: John J. Spath, P.O Box 1086, Kingston, Pa. 18704-0086

[21] Appl. No.: 914,003
[22] Filed: Aug. 5, 1997
[51] Int. Cl.⁶ ...................................................... B65B 21/10
[52] U.S. Cl. .......................... 414/343; 414/421; 414/534; 414/535
[58] Field of Search ..................... 414/340, 343, 414/401, 418, 419, 420, 421, 529, 530, 535, 536; 141/364, 391; 222/166

[56] References Cited

U.S. PATENT DOCUMENTS

| | | | |
|---|---|---|---|
| 1,931,354 | 10/1933 | Morgan | 414/534 |
| 1,937,668 | 12/1933 | Pine | 414/421 |
| 2,573,958 | 11/1951 | Eaddy | 414/420 |
| 3,291,329 | 12/1966 | Ord | 414/420 |
| 4,536,033 | 8/1985 | Allen | 414/421 |
| 4,808,058 | 2/1989 | Carney et al. | 414/343 |
| 5,207,550 | 5/1993 | Lehman | 414/421 |
| 5,320,475 | 6/1994 | Pinder | 414/421 |
| 5,406,996 | 4/1995 | Wagner et al. | 141/364 |
| 5,422,614 | 6/1995 | Perussi et al. | 414/420 |
| 5,779,428 | 7/1998 | Dyson et al. | 414/530 |

Primary Examiner—Thomas J. Brahan
Attorney, Agent, or Firm—Michael Ebert

[57] ABSTRACT

A cart and caddie system for storing and transporting standard, multi-gallon water bottles, and for inverting each bottle so that its neck is received in an open well at the top of a water dispenser to feed water therein. The wheeled cart includes a lower deck loaded by depleted bottles taken from the dispenser and an upper roller deck loaded by filled water bottles and having an outlet end. The wheeled caddie which is provided with a swiveled cradle is movable from a position adjacent the cart in which the cradle lies in registration with the outlet end of the upper deck whereby a filled bottle can then be transferred from the upper deck to the cradle and then to a position adjacent the dispenser at which the cradle can then be swung to invert the bottle to cause its neck to be received in the open well and thereby renew the water supply of the dispenser.

10 Claims, 5 Drawing Sheets

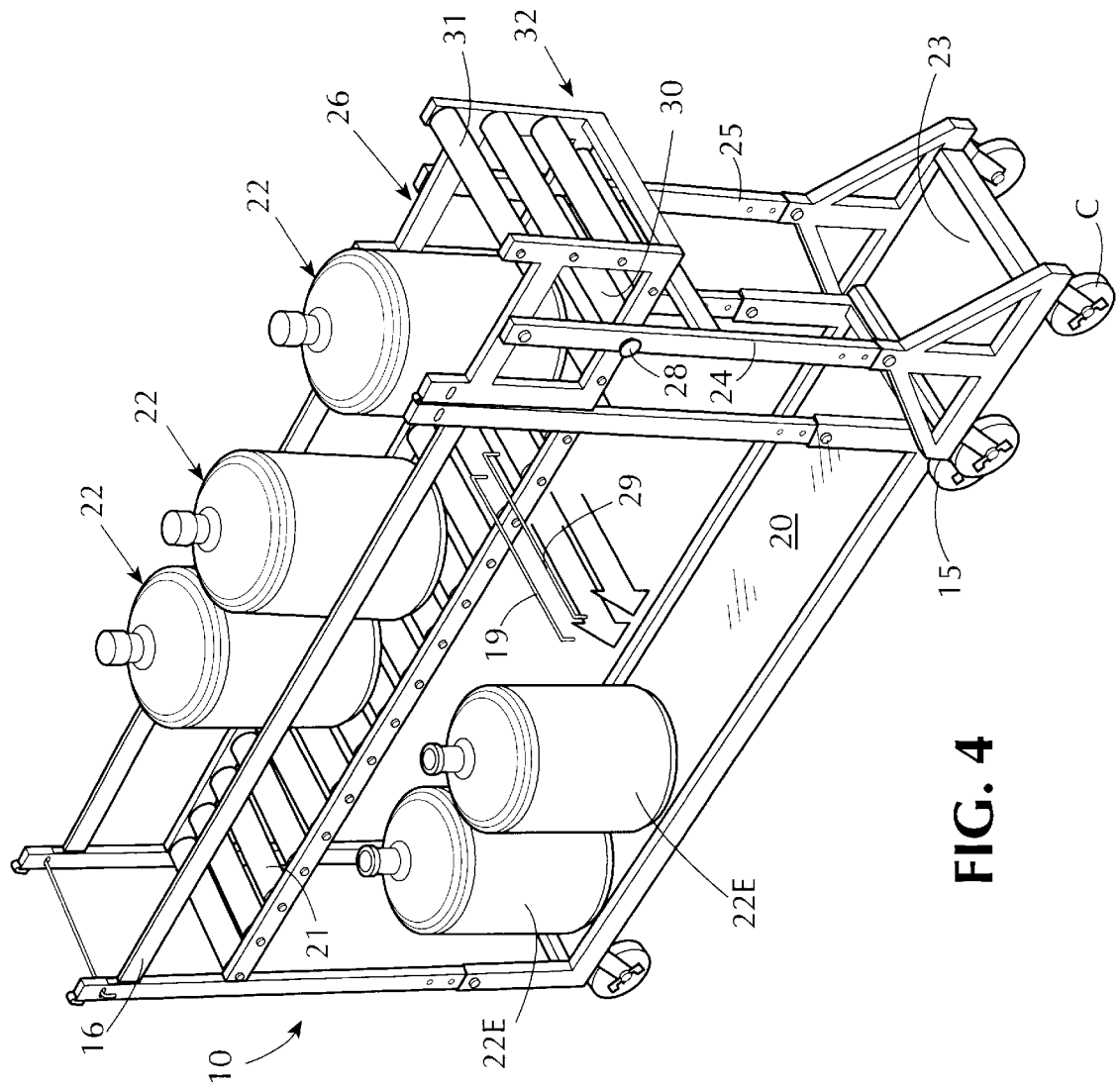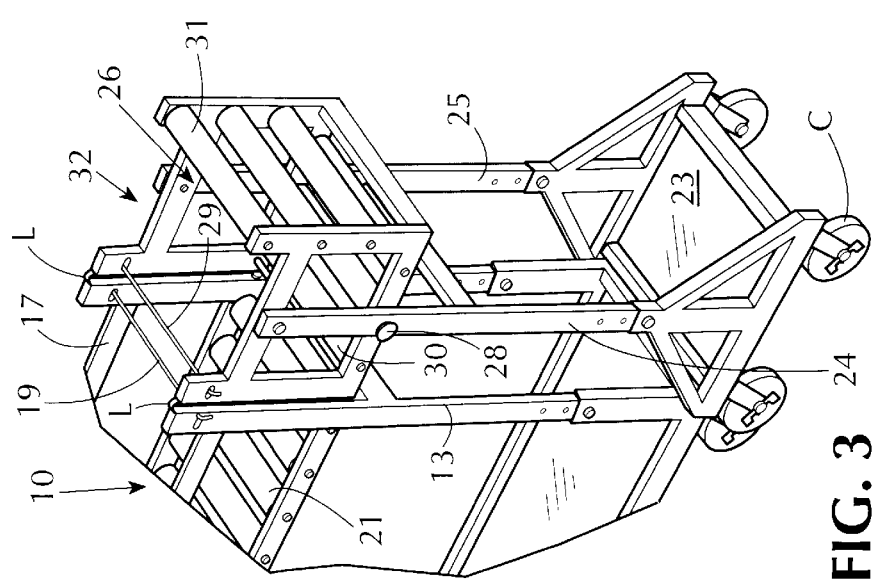

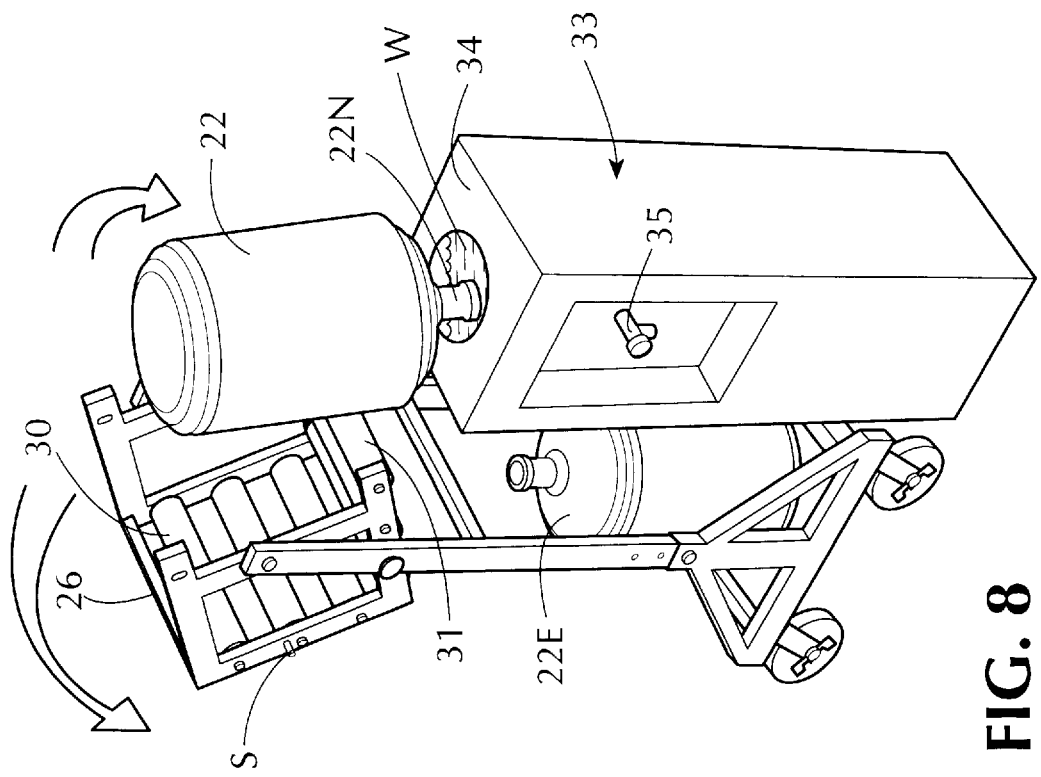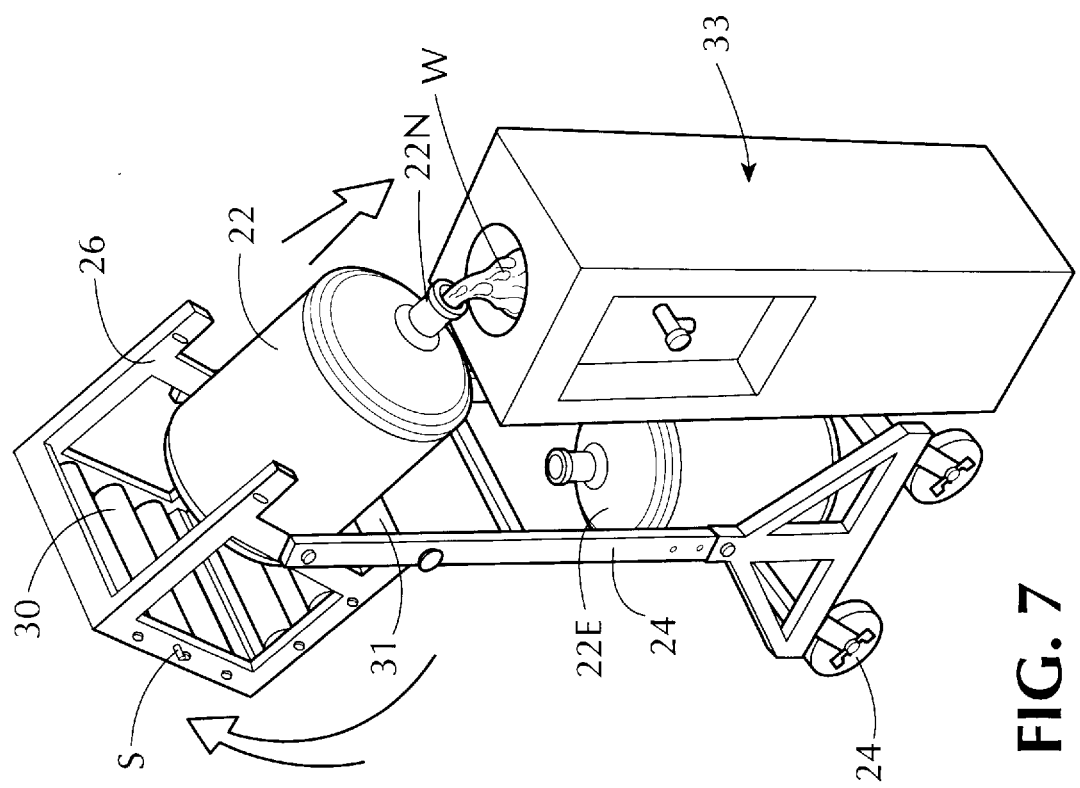

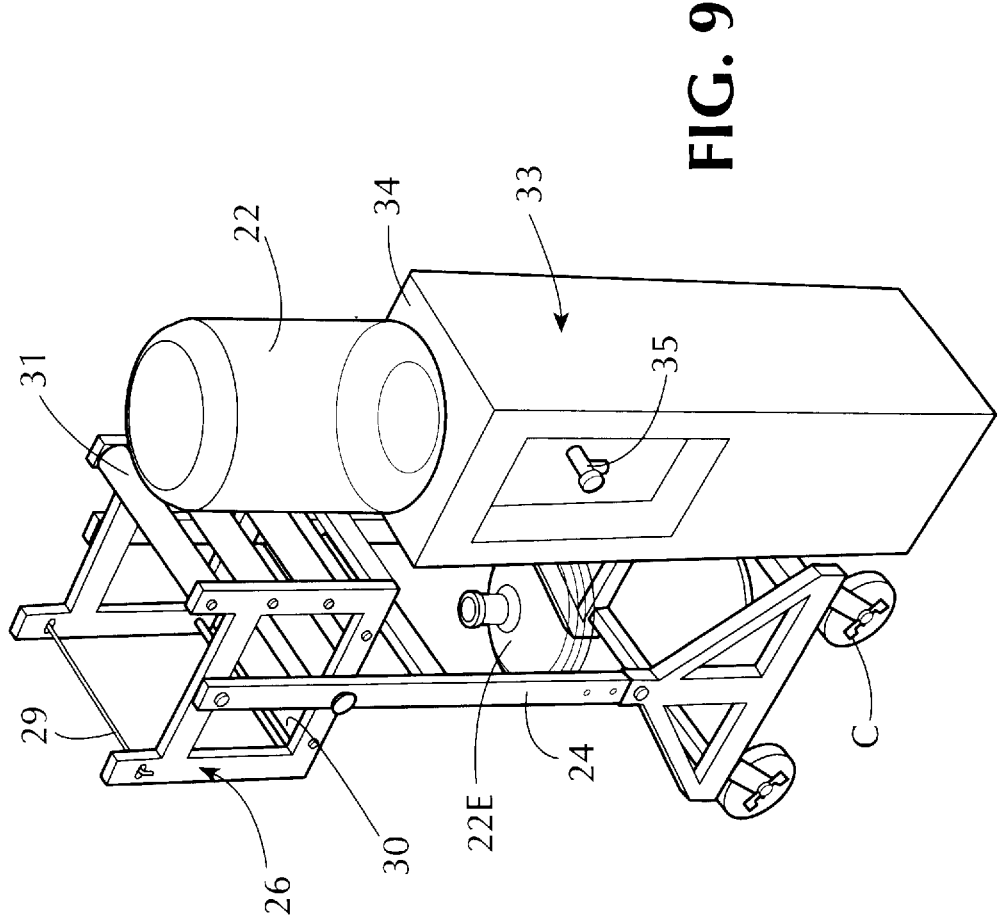

CART AND CADDIE SYSTEM FOR STORING AND DELIVERING WATER BOTTLES

BACKGROUND OF INVENTION

1. Field of Invention

This invention relates generally to apparatus for storing, transporting and inverting standard large water bottles whose water is to be dispensed by a dispenser having an open well at its top in which is received the neck of an inverted bottle, and more particularly, to a wheeled cart and caddie system for carrying out these operations without requiring an operator to lift a filled bottle.

2. Status of Prior Art

The main source of drinking water is tap water, that is water drawn directly from a tap or faucet coupled to a water-supply pipe. Depending on the location of the tap, tap water is more or less impure, for it usually contains mineral salts and chloride, and in some cases, particularly when the water supply pipe is corroded, particulate matter and other contaminants.

It is therefore the common practice in many residences, offices, manufacturing plants and other populated establishments to use bottled spring water of high purity, free of contaminants, as a drinking water supply. The term "spring water" as used herein encompasses any pure drinking water not necessarily of spring origin.

A typical standard bottle of spring water is a cylindrical glass or plastic container having a five gallon capacity and a neck from which the water is discharged. A conventional dispenser for a standard multi-gallon water bottle includes a top having an open well therein adapted to receive the neck of the bottle. When the normally upright bottle is inverted to place the neck within the well, the water from the bottle is then fed into the well. The dispenser which is provided with a faucet coupled to the well, may also include a refrigerator unit to cool the water and a heater unit to heat the water. The term water dispenser, as used herein, is applicable to any dispenser whose water supply is derived from a standard water bottle.

As used herein the term "standard water bottle refers to bottles in common use as a water supply for a conventional water dispenser and is not limited to those having a 5 gallon capacity, nor to those having a cylindrical shape. Thus standard bottles also come in 3 and 6 gallon sizes and in square shapes. But standard water bottles regardless of their capacity and shape are all useable as a water supply with conventional water dispensers.

The handling of standard multi-gallon filled water bottles, especially those weighing over 40 pounds presents many problems. The first problem arises when a water bottle distributor drops off several five gallon filled water bottles at a commercial establishment which ordered these bottles to supply water to one or more dispensers placed at various sites in the establishment. It is not the usual practice for an establishment, even one having a single dispenser, to order one bottle at a time from a distributor, but to order several bottles to lay in an adequate supply for several weeks.

Hence at the establishment, an individual assigned to this task must carry all of the filled bottles dropped off by the distributor to a storage area and there load the bottles on a shelf. Or in many cases, it is the delivery personnel of the distributors who carry the water bottles to the storage area and stow them on the floor or possibly a shelf. And when the water supply at a particular dispenser is depleted, then an individual assigned to this task must carry the empty water bottle to the storage area to be later picked up by the distributor, and he must hand carry a filled bottle from the storage area to the depleted dispenser.

Then at this dispenser, the individual carrying the filled bottle must raise it above the top of the dispenser and quickly invert it so that its open neck is received in the well of the dispenser. Should this inversion not be quickly effected, water will spill out of the neck of the bottle away from the well.

The distribution procedure for residential customers depends on the nature of the residence and is different for detached homes than for apartment houses. But in any residence one must have a storage space for the bottles delivered by the distributor and the resident has the task of lifting the bottles and inverting them onto the top of the water dispenser.

The steps of transporting, lifting and inverting heavy multi-gallon standard bottles filled with water calls not only for physical strength, but also a degree of dexterity that may be lacking in those individuals who are called upon to perform these strenuous tasks, particularly those having back problems and other physical disabilities or handicaps.

It is therefore not an uncommon experience for a person handling a heavy water bottle made of glass or plastic to drop and possibly shatter the bottle. The release into a room of 5 gallons of water may not only result in water damage, but the shattered particles of the bottle may be injurious to those in the vicinity of this accident.

In order to facilitate the transport of filled water bottles from an unloading platform where they are dropped off by a water distributor to a storage area where they are stored, one can use a conventional cart for this purpose. And one can also use a dolly of some sort to transport a single filled bottle from the storage area to a depleted water dispenser. But a cart or dolly does not relieve an individual assigned to this task, from the need to lift and invert a filled bottle of water weighing more than 40 pounds and from placing the raised inverted bottle into the well on the top of a water dispenser.

It is because of the serious difficulties experienced in handling heavy water bottles that attempts have heretofore been made to overcome these difficulties. Thus the 1977 Perry et al. U.S. Pat. No. 4,036,382 discloses a bottle-handling apparatus adapted to lift a heavy water bottle from a floor level in an upright position to a raised position and then inverting the bottle at its raised position and lowering it into the bottle-receiving inlet of a water cooler. The Perry et al. apparatus includes a pair of vertical rails that define guide slots for a bottle carrier that is pulled upwardly with the bottle in an upright position to the top of the guide slots, and then rotated to an inverted position on a pair of idlers disposed at the top of the guide slots.

The 1995 Perussi U.S. Pat. No. 5,424,614 discloses a lifting and inverting apparatus for a filled water bottle in which the bottle is held within a girdle coupled to a yoke secured to a line operated by a cranking device that raises the yoked bottle to a height above a water cooler. The girdle is rotatable on the yoke to permit inversion of the bottle.

The 1995 patent to Posly U.S. Pat. No. 5,379,814 discloses a lift mechanism for a water bottle which raises the bottle from a lower upright position to an elevated position at which the bottle can be rotated and inverted so that it can be placed neck down in the well of a cooler. The Wagner et al. U.S. Pat. No. 5,406,996 (1995) shows a wheeled lift mechanism in which a clamped water bottle is raised from a lower to an upper position, the clamp then being swiveled to invert the bottle so that it can go neck-down into a water dispenser.

All of the above noted prior patents require a hand-operated lift mechanism to raise a heavy bottle from an upright position, just above floor level, to a raised position about a water dispenser, and means at the raised position to invert the bottle.

Apart from the difficulties experienced in handling water bottles, is the problem of storing these bottles. In many commercial establishments having water dispensers, it is the practice to store full and empty water bottles on the floor of a storage area carved out of a file room or an office in active use by employees of the company. Or the bottles may be placed in a section of a company lunchroom. This practice leaves much to be desired, for not only is the storage area unsightly, but employees who pass through the storage area may trip or fall over the stored bottles and suffer injuries.

SUMMARY OF INVENTION

In view of the foregoing, the main object of this invention is to provide a cart and caddie system adapted to handle standard multi-gallon filled bottles of water from a point at which the bottles are brought to an establishment by a water distributor to a point at which each filled bottle is placed by an operator in a water dispenser.

More particularly, an object of this invention is to provide a system of this type in which the cart functions as a carrier for several filled bottles of water and for a like number of depleted bottles, whereby the cart which is loaded by a water distributor who delivers the filled bottles to an establishment serves as a storage facility for the bottles as well as a carrier therefor; thereby avoiding the hazards incident to storing bottles on the floor of a storage area.

Also an object of the invention is to provide a caddie which cooperates with the cart whereby a filled bottle on the cart can be transferred onto the caddie without the need to physically carry the bottle to effect this transfer.

A significant feature of a system in accordance with the invention is that in no stage of bottle handling, including the stage at which a filled bottle is transferred from the cart to the caddie and the stage at which a filled bottle in the caddie is inverted is the handler required to exercise skill to carry out these tasks. The handler need not be dexterous, nor need he or she have physical strength sufficient to lift a heavy filled bottle.

Briefly stated, these objects are accomplished by a cart and caddie system for storing and transporting standard, multi-gallon water bottles, and for inverting each bottle so that its neck is received in an open well at the top of a water dispenser to feed water therein. The wheeled cart includes a lower deck loaded by depleted bottles taken from the dispenser and an upper roller deck loaded by filled water bottles and having an outlet end.

The wheeled caddie which is provided with a swiveled cradle is movable from a position adjacent the cart in which the cradle lies in registration with the outlet end of the upper deck whereby a filled bottle can then be transferred from the upper deck to the cradle and then to a position adjacent the dispenser at which the cradle can be swung to invert the bottle to cause its neck to be received in the open well and thereby renew the water supply of the dispenser.

BRIEF DESCRIPTION OF DRAWING

For a better understanding of the invention as well as other objects and further features thereof, reference is made to the following detailed description to be read in conjunction with the accompanying drawings, wherein:

FIG. 3 illustrates the caddie coupled to the cart to effect, when a safety bar is removed, a transfer of a filled bottle from the cart to a cradle in the caddie;

FIG. 4 shows the filled bottle being transferred to the cradle;

FIG. 7 shows the cradle of the caddie so angled as to roll the filled bottle toward the open well;

FIG. 8 shows the filled bottle out of the cradle of the caddie and almost fully inverted over the well; and FIG. 9 shows the completion of the installation, with the filled bottle in an inverted state resting on top of the water dispenser.

DESCRIPTION OF INVENTION

The Cart

Figure 2:
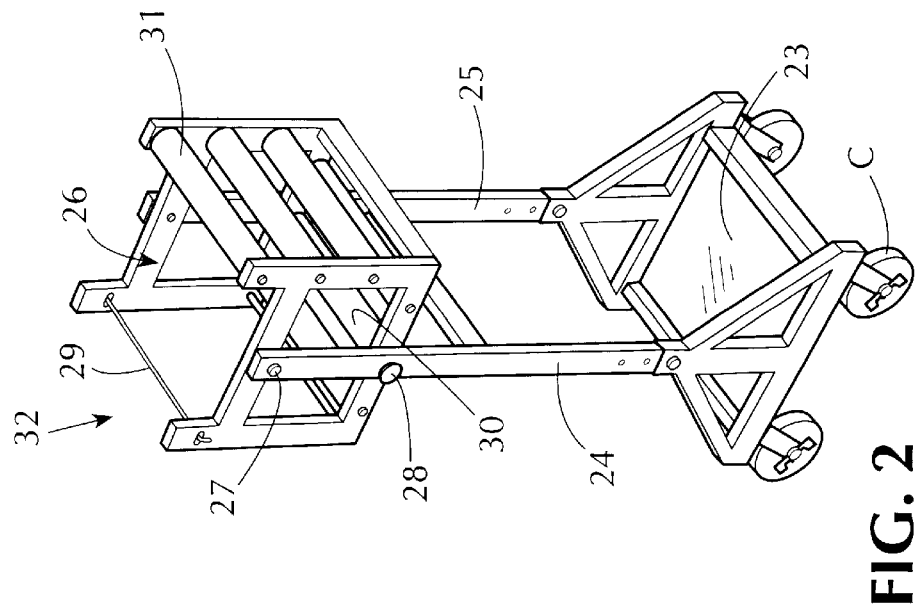
FIG. 2 is a perspective view of the caddie included in the system.
Figure 1:
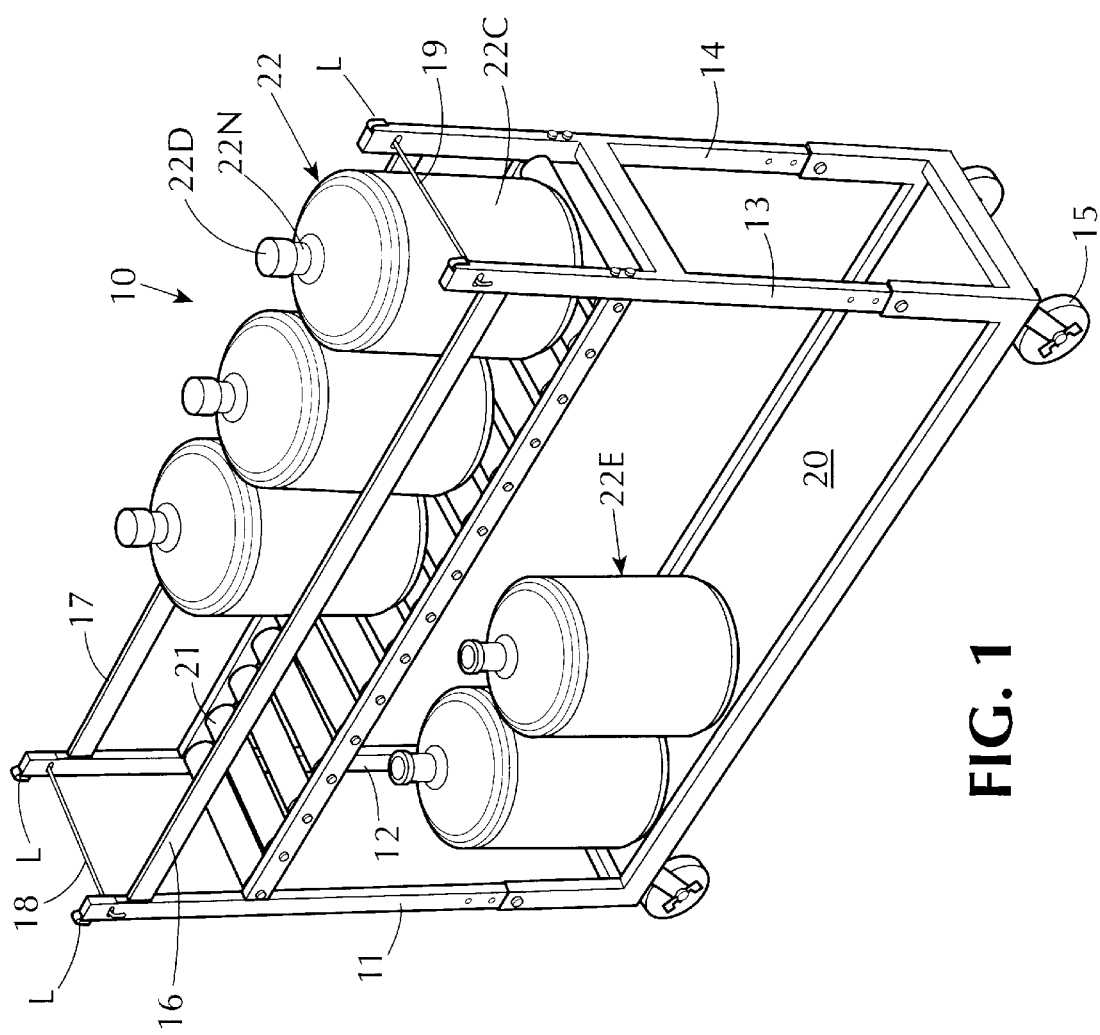
FIG. 1 is a perspective view of the wheeled cart included in a cart and caddie system in accordance with the invention.

The main components of a system in accordance with the invention for handling and deploying standard multi-gallon bottles containing pure drinking water are a wheeled cart 10, as shown in FIG. 1, and a wheeled caddie 32, as shown in FIG. 2.

Cart 10 includes a rectangular frame defined by four corner posts 11 to 14 of adjustable height supported on a set of four lockable casters 15. Bridging the upper ends of posts 11 and 13 is a removable side rail 16, and bridging the upper ends of posts 12 at one end of the cart and 14 is a removable side rail 17. Extending between the upper ends of posts 11 and 12 is a removable end safety bar 18, and extending between the upper ends of posts 13 and 14 at the other end of the cart is a removable end safety bar 19.

At the base of the cart is a storage deck 20 and above the storage deck is an upper roller deck 21 formed by a horizontal row of rollers which run between the left and right ends of the frame. Either end of roller deck 21 can serve as the outlet end of this deck, the outlet being opened only when the end safety bar is removed.

Upper roller deck 21 of the cart is loadable with standard multi-gallon bottles 22 each filled with drinkable water. The dimensions of deck 21 in the cart illustrated are such as to accommodate a row of five such bottles. But in practice the cart may be dimensioned to accommodate a smaller or greater number of bottles, such as 7 bottles on each deck or 4 bottles.

As shown in FIG. 1, each bottle 22 is formed of a cylindrical container of glass or high-strength transparent synthetic plastic having a neck 22N sealed by a cap 22D. In a typical pure drinking water bottle, the cap is provided with a plastic seal having a pull tab to release the cap so that it can be removed from the neck. In order to install the filled bottle on a water dispenser, the cap must first be removed, the bottle which is normally upright, must be raised and then inverted so that the open neck thereof enters the open well at the top of the water-depleted dispenser. And this action must take place quickly, so that no water from the neck of the bottle spills away from the well.

As previously pointed out, the invention is not limited to the handling of cylindrical water bottles, for it is also applicable to standard bottles of square or any other shape and to those of different multi-gallon capacity.

All of the posts (11 to 14) are provided with docking locks L to fasten cart 10 to caddie 32 in order to effect transfer of a filled bottle 22 from the upper deck of the cart to the caddie in a manner to be later described.

Lower deck 20 of the cart is reserved for depleted bottles 22E, this deck having the same bottle capacity as the upper deck. When a water bottle installed on a water dispenser is depleted of water and is removed therefrom so that it can be replaced by a filled bottle taken from the upper deck of the cart, the removed empty bottle is placed on the lower deck. Thus, in practice, when the cart is initially loaded, there are five full bottles on the upper deck, and no empty bottles on the lower deck. But when there are no filled bottles on the upper deck, there are then five empty bottles on the lower deck.

It is important to note that when a cart 10 is on the grounds of an office or other establishment equipped with one or more water dispensers, no member of this establishment is required at any time to carry a filled bottle for servicing the dispensers. When five filled bottles are ordered by the establishment from a water distributor, or are automatically replenished by the distributor through servicing based on customer usage, it is the distributor's agent who loads these bottles on the upper deck of the cart after first removing side rail 16 or side rail 17 depending on how the cart is situated in the storage area, and takes back the empty bottles on the lower deck.

Once the cart is loaded by the distributor's agent, and wheeled into a storage area, then when it becomes necessary to take a filled bottle from the cart and deliver it to a depleted water dispenser, this action is carried out by the wheeled caddie 32 without entailing any lifting of a filled bottle. And no time therefore is any individual who is required to service the water dispenser ever called upon to exert more than very mild physical effort to carry out this operation.

The Caddie

As shown in FIG. 2, caddie 32 includes a rectangular base 23 forming a shelf below which at its four corners are lockable casters C. Shelf 23 serves to store an empty bottle removed from a dispenser serviced by the caddie. Mounted above base 23 and supported by a spaced pair of vertical posts 24 and 25 of adjustable height extending above a triangular truss is a cradle 26 which is swiveled from the upper ends of these posts by pivot pins on posts 24 and 25, each provided with a cradle pivot lock 28 which must be pulled out to release the pivot so that the cradle can be swung about the pivot. When the pivot is locked, the cradle is then horizontally oriented. And when the pivot is released, the cradle may be rocked about the horizonal axis to tilt the cradle to angle the bottle held therein. At the front end of cradle 26 is a removable safety bar 29 whose right angle ends pass through horizontal slots in the frame of the cradle. The right angle ends of the bar normally extend downwardly from the horizontal slots thereby locking in the bar. But to remove the bar, all that is necessary is to rotate it to cause the right angle ends to extend horizontally so that the bar can then be withdrawn from the horizontal slots.

Cradle 26 has a horizontal seat defined by a series of three rollers 30 and a vertical back formed by a series of three rollers 31. Hence the reason vertical posts 24 and 25 of caddie 32 are adjustable in height to more or less elevate cradle 26 with respect to the top of a water dispenser to be serviced, is that commercial and residential water dispensers vary in height and it therefore becomes necessary to accommodate the caddie to the particular dispenser it serves. And the upper deck of the cart is also adjustable in height so that its height can be matched to that of the cradle.

Operation of System

FIG. 4 shows cart 10 when there are three remaining filled water bottles 22 on the upper roller deck 21 and only two empty bottles 22E on the lower storage deck 20. In practice at a given site, such as a large factory, there may be several carts 10 to service a large number of water dispensers.

In order to transfer a filled bottle 22 on cart 10 to cradle 26 of caddie 32 which is now joined to the cart so that rollers 21 on the upper deck of the cart are in line with the seat rollers 30 of the cradle, it is necessary first to remove safety bar 19 from the end of the upper deck and safety bar 29 from the input to the cradle. It becomes possible to now roll bottle 22 from the upper deck to the seat of the cradle, as shown in FIG. 4.

It is to be noted that caddie 32 is somewhat wider than cart 10 so that casters C of the caddie straddle casters 15 of the cart, making it possible for cradle 26 to abut the end of the cart to which it is locked.

Figure 5:
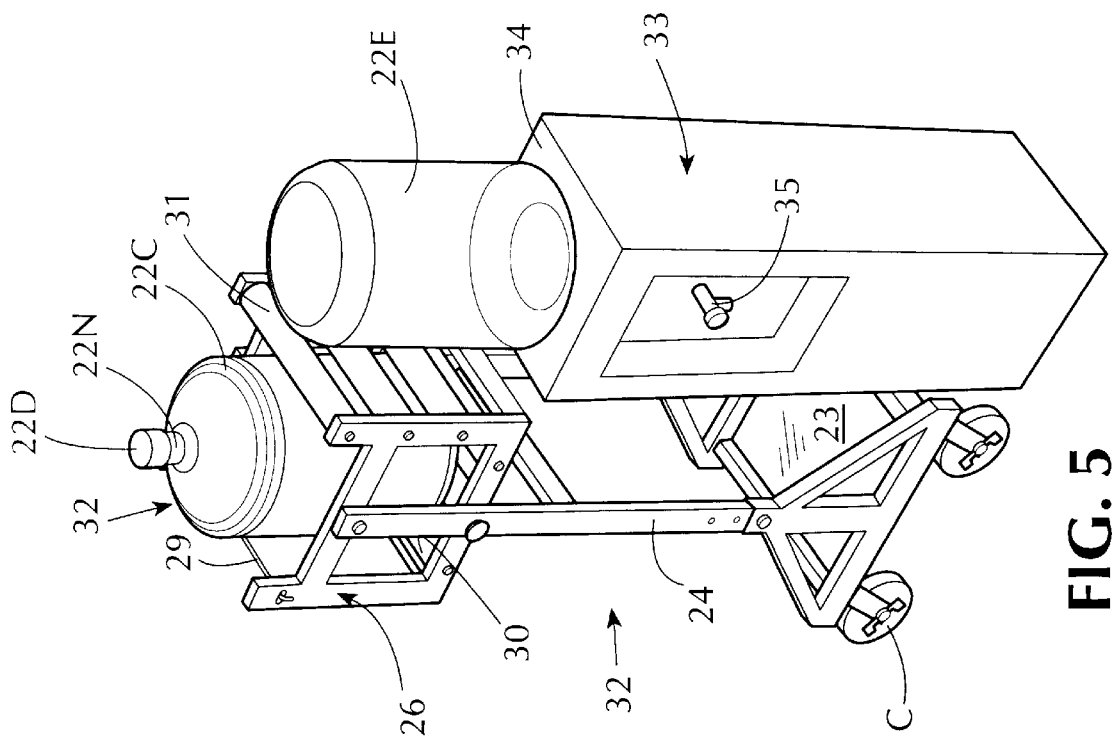
FIG. 5 shows the loaded caddie adjacent a water dispenser whose bottle is depleted of water.

In order now to transport the bottle loaded caddie to water dispenser 33, as shown in FIG. 5 caddie 32 must be wheeled so that its cradle 26 is next to flat top 34 of dispenser 33 at one side thereof. The front of the dispenser is provided with a faucet 35 for dispensing the water fed into the open well of the dispenser by a filled water bottle. In FIG. 5, water bottle 22E is empty and therefore must be replaced by filled bottle 22 in the cradle of the caddie.

Figure 6:
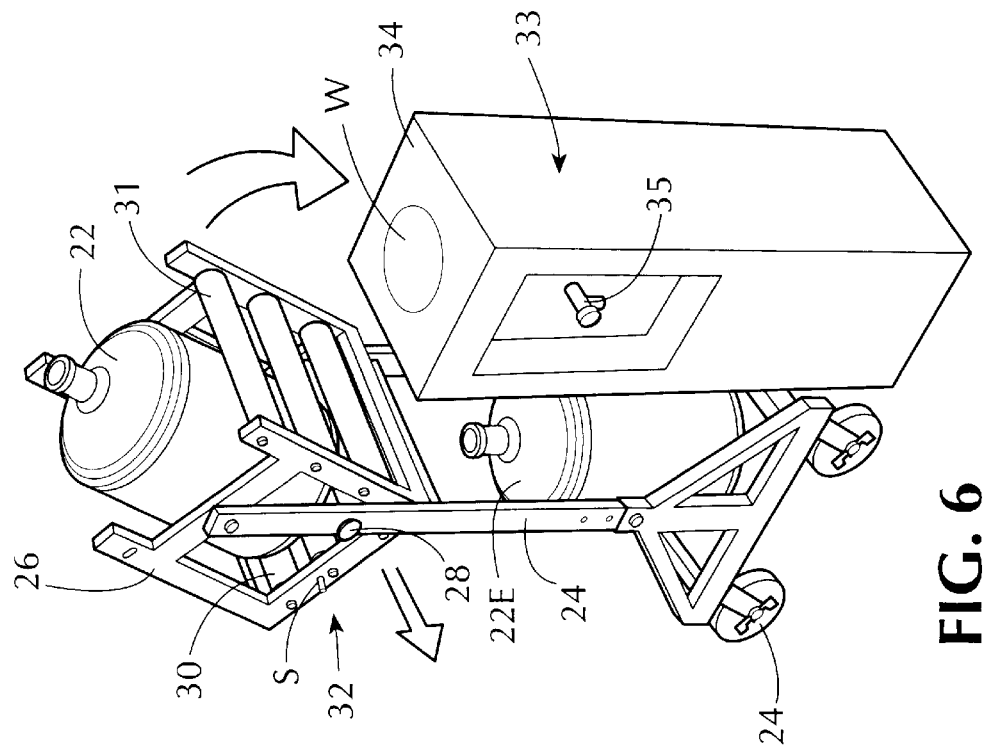
FIG. 6 shows the depleted bottle on the base of the caddie and it also shows the cradle of the caddie carrying the filled bottle being tipped forward towards the open well of the dispenser.

The next step, as shown in FIG. 6, is to remove the empty bottle 22E from the dispenser and place it on the lower shelf of caddie 32, thereby exposing open well W at the top of the dispenser. Then the sealing cap is removed from filled bottle 22 on the cradle, safety bar 29 is removed and the cradle pivot locking pin 28 pulled out to permit the operator to tilt the cradle toward open well W. Cradle 26 is provided with a swivel stop S so that the cradle, can only swing in the direction of the dispenser.

As the cradle swings toward open well W of the water dispenser, as shown in FIG. 7 bottle 22 now slides downwardly on the back rollers 31 of the cradle so that neck 22N of the bottle is now angled with respect to open well W, and proceeds to discharge water from the bottle into the well. As neck 22N of bottle 22 enters the well W, as shown in FIG. 8, the bottle assumes an almost upright position, and engages the top roller 31 in the back of the cradle, being pushed thereby to assume the fully upright position shown in FIG. 9, the filled bottle being now installed in the water dispenser.

In FIG. 9, cradle 26 of the caddie has returned to its normal horizontal position with safety bar 29 in place and empty bottle 22E is now on the bottom shelf of the caddie. The caddie is then wheeled back to cart 10, and empty bottle 22E taken from the caddie and placed in the lower deck of the cart.

It is never necessary with a cart and caddie system in accordance with the invention for the operator of the system to ever lift a heavy filled standard multi-gallon bottle, and there is no danger therefore that this operator will ever drop the bottle, because he or she lacks adequate strength to handle it.

The cart acts as a storage facility for a group of filled bottles and it is an agent of the distributor who delivers these bottles to the establishment that placed the order who lifts the bottles to place them on the upper deck of the cart. But once the filled bottles are so placed, no further lifting is required in servicing the water dispensers.

While there has been shown a preferred embodiment of the invention, it is to be understood that many changes may be made thereon within the spirit of the invention.

I claim:

1. A cart and caddie system for storing and transporting standard, multi-gallon, water-filled bottles, each having a neck, and for inverting the bottle so that its neck is then received in an open well at the top of a water dispenser to feed water from the bottle into the well; said system comprising:

A. a wheeled cart provided with an upper roller deck having an outlet end, said upper deck being loadable with a row of filled bottles each of which can successively be rolled out of the outlet end; and B. a wheeled caddie provided with a swiveled cradle capable of accommodating a filled bottle, said caddie being movable from a position adjacent the cart at which the cradle lies in registration with the outlet end whereby a filled bottle on the upper deck can then be transferred to the cradle, to a position adjacent the dispenser at which the cradle can then be tilted to invert the bottle to cause its neck to be received in the open well of the dispenser and thereby renew its supply of water.

2. A system as set forth in claim 1, in which said cart has a lower deck to accommodate a row of empty bottles.

3. A system as set forth in claim 1, in which said cradle has a seat formed by a series of rollers and a back formed by a series of rollers, whereby a filled bottle in the roller deck of the cart can be rolled onto the seat of the cradle, and the bottle, when the cradle is tilted, can thereafter be rolled out of the cradle on the back rollers.

4. A system as set forth in claim 3, in which said cradle of the caddie is supported above a base shelf adapted to accommodate an empty bottle removed from the dispenser.

5. A system as set forth in claim 4, in which said cradle is supported above the base by a pair of extendible vertical posts whereby the height of the cradle is adjustable to match that of the upper deck of the cart.

6. A system as set forth in claim 3, in which the swiveled cradle is provided with a retractable swivel lock to normally maintain the seating the cradle in a horizontal plane, and is also provided with a swivel stop to permit the cradle to swing only in the direction of the dispenser.

7. A system as set forth in claim 1, in which each bottle is cylindrical and has a 5 gallon capacity, the bottle being provided with a neck sealed by a removable cap.

8. A system as set forth in claim 1, in which said cart is provided with a rectangular frame including four vertical corner posts, and a pair of removable side rails bridging the upper ends of the posts at one end of the frame with the upper ends of the posts at the other end of the frame.

9. A system as set forth in claim 8, further including a removable bar extending between the upper ends of the posts at one end of the frame.

10. A system as set forth in claim 9, further including locking means at the upper ends of the posts at said one end of the frame to lock this end to the cradle when the caddie is adjacent the cart.

* * * * *